(12) United States Patent
Alameh et al.

(10) Patent No.: US 9,176,614 B2
(45) Date of Patent: Nov. 3, 2015

(54) ADAPATIVE SENSING COMPONENT RESOLUTION BASED ON TOUCH LOCATION AUTHENTICATION

(71) Applicant: MOTOROLA MOBILITY LLC, Libertyville, IL (US)

(72) Inventors: Rachid M. Alameh, Crystal Lake, IL (US); Robert T. Love, Barrington, IL (US); Jiri Slaby, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/928,470

(22) Filed: Jun. 27, 2013

(65) Prior Publication Data

US 2014/0354556 A1 Dec. 4, 2014

Related U.S. Application Data

(60) Provisional application No. 61/827,929, filed on May 28, 2013.

(51) Int. Cl.
G06F 3/041 (2006.01)
G06F 21/32 (2013.01)
G06F 3/0488 (2013.01)

(52) U.S. Cl.
CPC .............. *G06F 3/041* (2013.01); *G06F 3/0416* (2013.01); *G06F 3/04886* (2013.01); *G06F 21/32* (2013.01)

(58) Field of Classification Search
CPC .......... G06F 2203/04101; G06F 3/044; G06F 3/0481; G06F 3/04817; G06F 3/0488; G06F 3/041–3/047; G06F 3/0416
USPC ......... 345/173–179; 178/18.01–18.09, 18.11, 178/19.01–19.07
See application file for complete search history.

(56) References Cited

U.S. PATENT DOCUMENTS 6,222,528 B1 * 4/2001 Gerpheide et al. ............ 345/173
8,094,173 B2 1/2012 Lee
(Continued)

FOREIGN PATENT DOCUMENTS

| WO | 9840962 A1 | 9/1998 |
|---|---|---|
| WO | 2012054350 A1 | 4/2012 |
| WO | 2012090805 A1 | 7/2012 |

OTHER PUBLICATIONS

International Search Report and Written Opinion of International application No. PCT/US2014/039501, mailed Nov. 20, 2014, 21 pp.
(Continued)

*Primary Examiner* — Stephen Sherman
(74) *Attorney, Agent, or Firm* — Shumaker & Sieffert, P.A.

(57) ABSTRACT

A display component (108) displays multiple icons that a user can touch. A sensing component (104) supports multiple resolution modes, including at least a high resolution mode and a low resolution mode. In one embodiment, in response to detecting an object touching one of the multiple icons while in the low resolution mode, at least a portion of the sensing component over the touched icon changes to operating in a high resolution mode. While in the high resolution mode, the user's fingerprint is sensed, and then the sensing component is returned to the low resolution mode. In another embodiment, icons are displayed in different regions of a display, and those different regions are associated with different sensing component resolutions. When an icon is touched, the touch is detected by the sensing component using the sensing component resolution associated with the region that includes the icon.

20 Claims, 10 Drawing Sheets

(56) References Cited

U.S. PATENT DOCUMENTS

| | | |
|---|---|---|
| 8,866,791 B2 | 10/2014 | Barnhoefer et al. |
| 2002/0005837 A1 | 1/2002 | Thomason et al. |
| 2007/0076923 A1 | 4/2007 | Chiu |
| 2007/0092118 A1 | 4/2007 | Tachibana |
| 2008/0309631 A1 | 12/2008 | Westerman et al. |
| 2009/0033522 A1 | 2/2009 | Skillman et al. |
| 2009/0138725 A1 | 5/2009 | Madhvanath et al. |
| 2009/0201246 A1* | 8/2009 | Lee et al. ............... 345/156 |
| 2009/0251436 A1 | 10/2009 | Keskin |
| 2009/0309851 A1* | 12/2009 | Bernstein ............... 345/174 |
| 2010/0007613 A1 | 1/2010 | Costa |
| 2010/0044121 A1 | 2/2010 | Simon et al. |
| 2010/0053116 A1 | 3/2010 | Daverman et al. |
| 2010/0134447 A1 | 6/2010 | Nakajoh |
| 2010/0156805 A1 | 6/2010 | Brand et al. |
| 2010/0253619 A1 | 10/2010 | Ahn |
| 2011/0025619 A1 | 2/2011 | Joguet et al. |
| 2011/0163966 A1 | 7/2011 | Chaudhri |
| 2011/0163976 A1* | 7/2011 | Barnhoefer et al. ...... 345/173 |
| 2011/0169760 A1 | 7/2011 | Largillier |
| 2012/0090757 A1 | 4/2012 | Buchan et al. |
| 2012/0176343 A1 | 7/2012 | Holmgren |
| 2012/0182253 A1 | 7/2012 | Brosnan |
| 2012/0262416 A1 | 10/2012 | Kitamura |
| 2012/0274583 A1 | 11/2012 | Haggerty |
| 2013/0135218 A1 | 5/2013 | Jain et al. |
| 2013/0285966 A1 | 10/2013 | Kimura et al. |
| 2014/0270413 A1* | 9/2014 | Slaby et al. ............... 382/124 |
| 2014/0270415 A1 | 9/2014 | Alameh et al. |
| 2014/0354556 A1 | 12/2014 | Alameh et al. |
| 2014/0359756 A1 | 12/2014 | Alameh et al. |

OTHER PUBLICATIONS

Prosecution History from U.S. Appl. No. 13/928,498 from Feb. 5, 2015 through Apr. 20, 2015 47 pp.

Final Office Action from U.S. Appl. No. 13/928,498, dated Jun. 29, 2015, 28 pp.

Response to Final Office Action from U.S. Appl. No. 13/928,498, filed Aug. 3, 2015 11 pp.

* cited by examiner

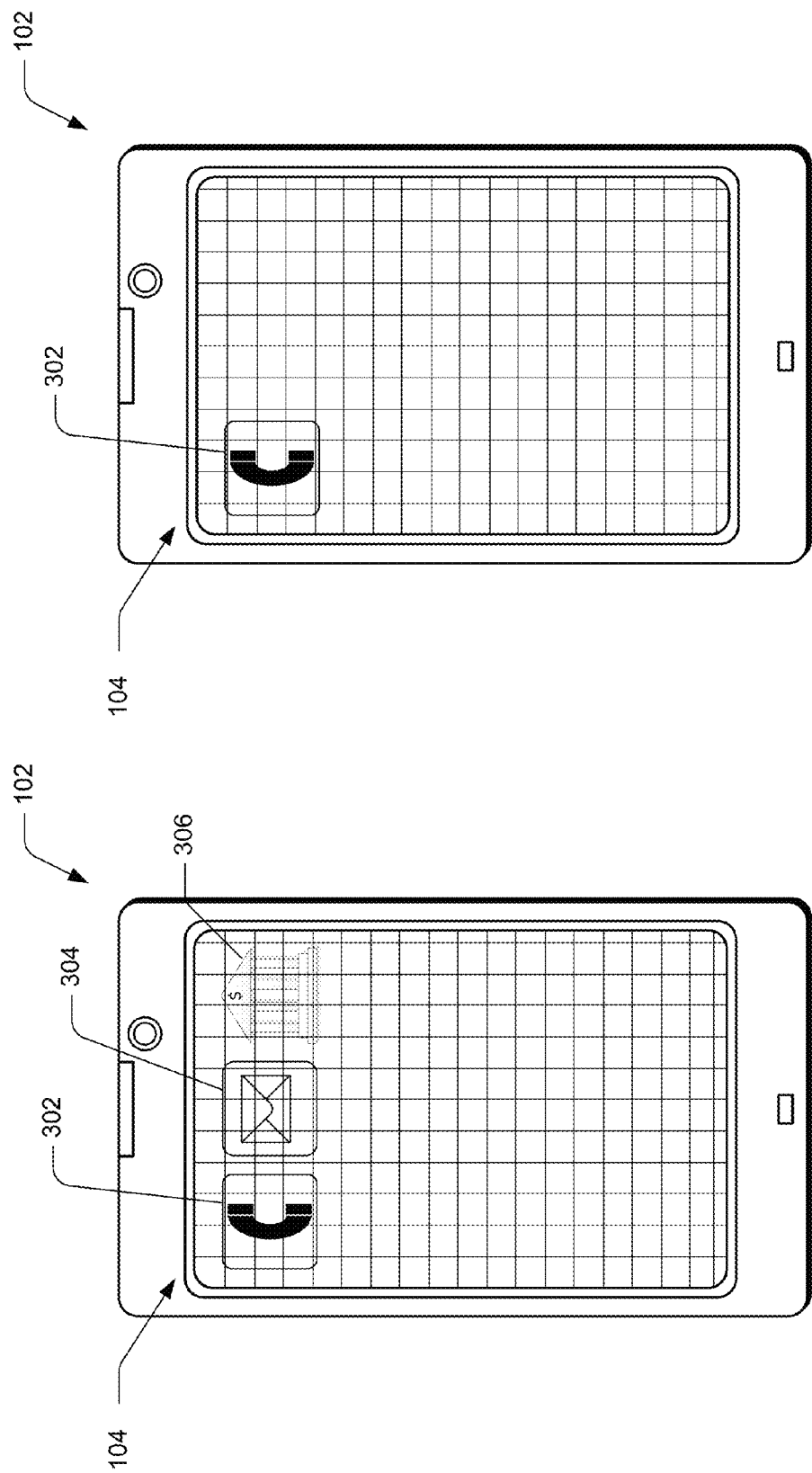

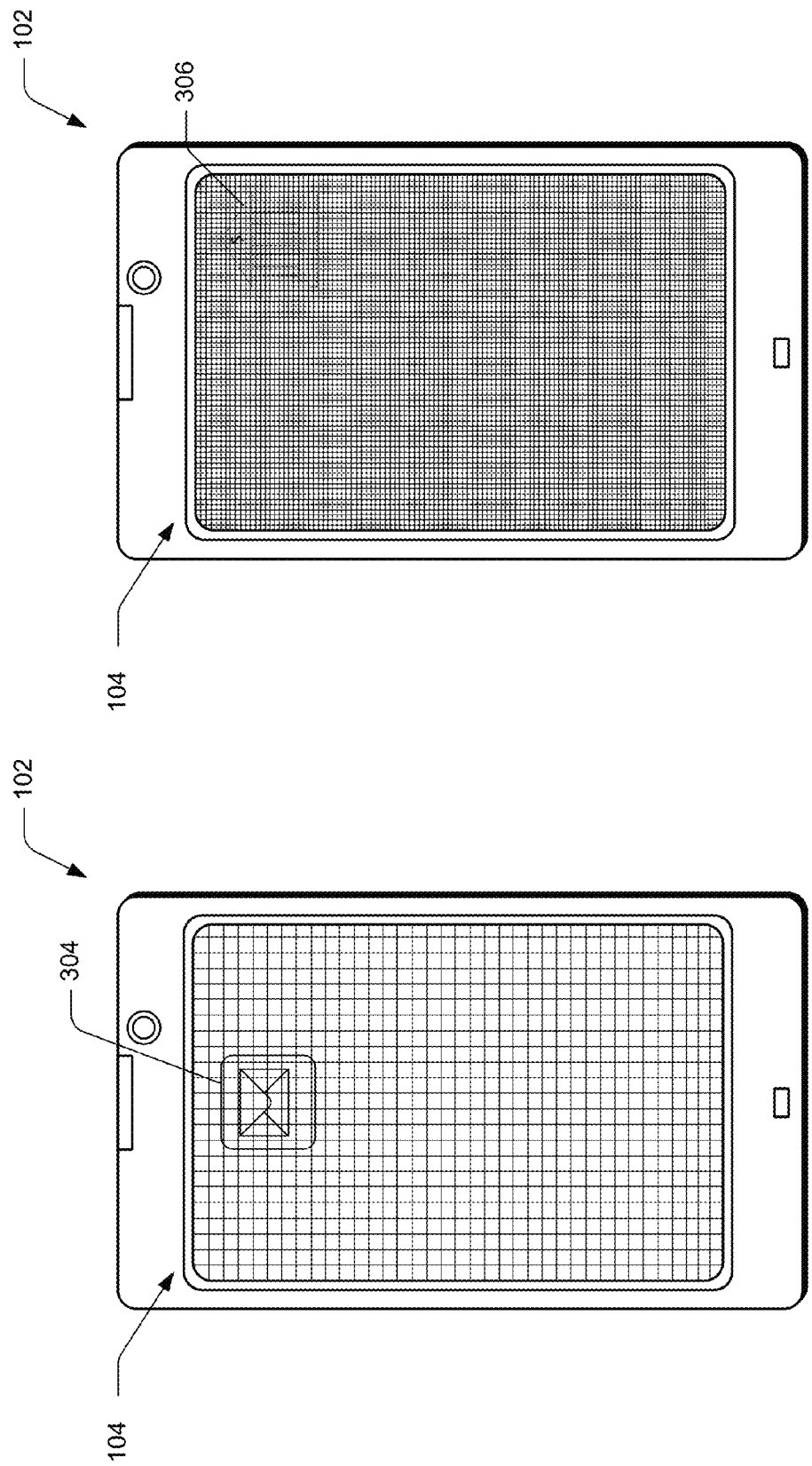

ADAPATIVE SENSING COMPONENT RESOLUTION BASED ON TOUCH LOCATION AUTHENTICATION

CROSS REFERENCE TO RELATED APPLICATIONS

This application claims priority to U.S. provisional patent application No. 61/827,929 filed on May 28, 2013, entitled ITO Enabled Authentication, the entire content of which is incorporated by reference.

BACKGROUND

As computing technology has advanced, computing devices such as smart phones, tablet computers, desktop computers, and so forth have become increasingly commonplace. Users often times desire to restrict access to their devices, whether because they don't want others to use the functionality that the devices provide, because they store data on their devices that they desire to keep secret, or some other reason. To restrict access, devices typically have an authentication step that must be passed by the user before they can access one of their devices, such as entry of a password or personal identification number (PIN) on a log-in screen, or capturing of a fingerprint by a dedicated fingerprint sensor. Such authentication steps, however, can be time consuming and detract from the usability of the devices, leading to frustrating user experiences.

BRIEF DESCRIPTION OF THE DRAWINGS

Embodiments of adaptive sensing component resolution based on touch location are described with reference to the following drawings. The same numbers are used throughout the drawings to reference like features and components:

FIGS. 3, 4, 5, 6, 7, and 8 illustrate examples of devices implementing the adaptive sensing component resolution based on touch location discussed herein;

DETAILED DESCRIPTION

Adaptive sensing component resolution based on touch location is discussed herein. Multiple icons are displayed and can be selected by being touched by an object, such as a user's finger. A sensing component supports multiple resolution modes, including at least a high resolution mode and a low resolution mode. In one embodiment, the sensing component operates in a low resolution mode, and in response to detecting an object touching one of the multiple icons while in the low resolution mode, at least a portion of the sensing component over the touched icon changes to operating in a high resolution mode. While in the high resolution mode, the user's fingerprint can be sensed, and then the sensing component can return to the low resolution mode. Thus, the sensing component can change to operating in a high resolution mode on demand, changing in response to a user touching a displayed icon.

In another embodiment, icons are displayed in different regions of a display, and those different regions are associated with different sensing component resolutions. When an icon is touched, the touch is detected by the sensing component using the sensing component resolution associated with the region that includes the icon. Thus, the touching of different icons can be detected, and optionally the user's fingerprint sensed, using different sensing component resolutions. Icons are grouped in a region of the display that matches their resolution or security setting, such as low resolution icons in a low resolution region.

Figure 1:
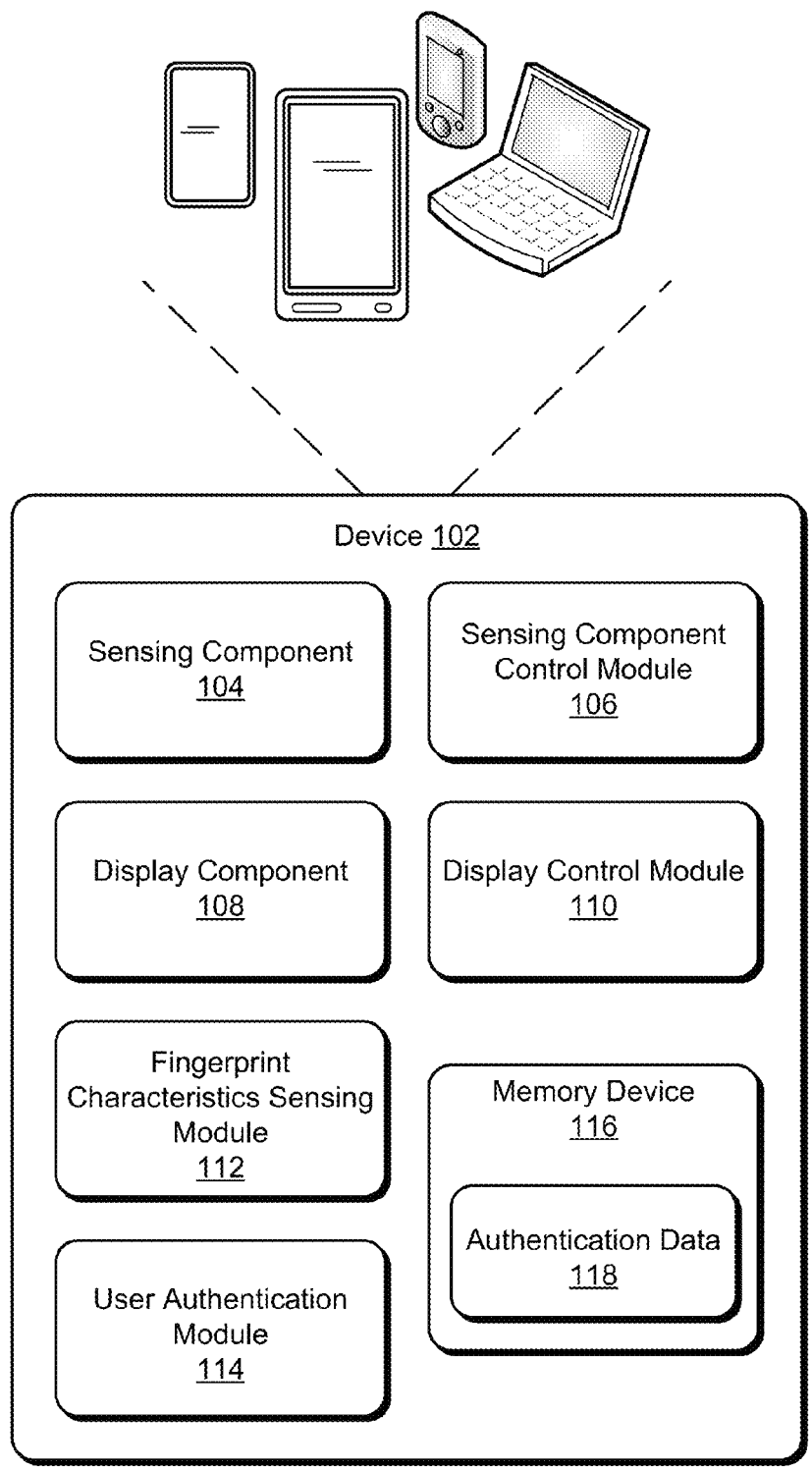
FIG. 1 illustrates an example device implementing the adaptive sensing component resolution based on touch location authentication in accordance with one or more embodiments.

FIG. 1 illustrates an example device 102 implementing the adaptive sensing component resolution based on touch location authentication in accordance with one or more embodiments. The device 102 includes a sensing component 104, a sensing component control module 106, a display component 108, a display control module 110, a fingerprint characteristics sensing module 112, a user authentication module 114, and a memory device 116 with authentication data 118. The device 102 can be any of a variety of different types of devices, such as a laptop computer, a cellular or other wireless phone, a tablet computer, an entertainment device, an audio and/or video playback device, a server computer, and so forth.

Although illustrated as a single device 102, it should be noted that different modules of the device 102 can alternatively be implemented in different devices. For example, the sensing component 104, the sensing component control module 106, the display component 108, and the display control module 110 can be implemented in one device, and the fingerprint characteristics sensing module 112, the user authentication module 114, and the memory device 116 can be implemented in another device. It should also be noted that the device 102 can include additional modules or components that provide additional functionality (e.g., a central processing unit (CPU), communication components, etc.), or alternatively such additional modules or components can be implemented in a separate device. For example, the device 102 may be implemented as a wearable device (e.g., a watch) that communicates with another device that implements the additional functionality.

The sensing component 104 is a multi-resolution sensing component, supporting multiple different sensing component resolutions. The sensing component 104 can be implemented using any of a variety of different technologies and types of sensors, such as capacitive sensors, pressure sensors, optical sensors, thermal sensors, ultrasonic sensors, imaging sensors, and so forth. For example, the sensing component 104 can be an indium tin oxide (ITO) sensor. The sensing component 104 can optionally be part of a sensor structure that includes one or more layers providing various additional functionality, such as protection from scratches and abrasions, feedback regarding a user touching the sensing component 104, and so forth.

The sensing component 104 supports sensing component resolutions including at least a low resolution and a high resolution, although the sensing component 104 can support any number of different sensing component resolutions. The sensing component 104 being in a particular sensing component resolution is also referred to as the sensing component 104 being in or operating in that resolution mode, and vice versa. For example, if the sensing component 104 is in a high sensing component resolution, then the component 104 is also referred to as being in or operating in a high resolution mode. By way of another example, if the component 104 is in or operating in a low resolution mode, then the sensing component 104 is also referred to as being in a low sensing component resolution.

The resolution of the sensing component 104 indicates a number of dots or points per unit that can be sensed by the component 104. References to these dots or points per unit being dots per inch are made herein, although it should be noted that other units can alternatively be used (e.g., centimeters). In one or more embodiments, the sensing component is a grid of lines (e.g., ITO lines) including multiple rows of lines and multiple columns of lines, some lines (e.g., rows, or alternatively columns) being drive lines and other lines (e.g., columns, or alternatively rows), being sense lines. A current is driven on the drive lines, and the sense lines sense an object touching the grid. The larger the number of drive and sense lines the greater the resolution that the sensing component 104 can provide. The dots or points in such a grid are at each intersection of a column line and a row line.

The high resolution mode refers to a mode having a larger number of dots per inch, such as on the order of a few hundred dots per inch. The high resolution mode has sufficient resolution to sense an object touching the sensing grid as well as detail regarding the object. In the high resolution mode, the sensing component 104 senses fingerprint data of a user's finger that is touching the component 104. The fingerprint data contains a fingerprint's pattern on each of the fingers, allowing the location of various minutiae or pattern(s) of the fingerprint and/or the outline or shape of the finger to be identified. The minutiae of the fingerprint refer to, for example, the ridge endings and bifurcations of the fingerprint. The minutiae of the fingerprint can optionally include additional details, such as the points at which scars begin, the points at which scars end, and so forth.

The low resolution mode refers to a mode having a smaller number of dots per inch, such as on the order of tens of dots per inch. The low resolution mode has sufficient resolution to sense an object touching the sensing grid, but very little (if any) detail regarding the object. For example, in the low resolution mode although a finger touching the sensing grid can be detected, fingerprint minutiae or pattern(s) are not detected. Although the low resolution mode has a lower resolution than the high resolution mode, the low resolution mode also typically consumes less power than the high resolution mode.

The sensing component 104 may also operate in one or more additional resolution modes. For example, the sensing component 104 may operate in a medium resolution mode having a smaller number of dots per inch than the high resolution mode but a larger number of dots per inch than the low resolution mode.

The sensing component 104 is thus able to operate in multiple different resolutions. In one embodiment, different areas of the sensing component 104 can operate in different resolutions concurrently. For example, one area of the sensing component 104 may be operating in a low resolution mode concurrently with another area of the sensing component 104 operating in a high resolution mode. Which areas operate in which resolution modes can be determined in various manners, such as based on the resolutions associated with different regions of the display component 108, based on where a touched icon is displayed on the display component 108, and so forth. In another embodiment, substantially the entire sensing component 104 operates in the same resolution mode, although the resolution mode that the component 104 operates in can change over time. For example, the sensing component 104 can operate in a low resolution mode until an object touching the sensing component 104 is sensed, and in response to sensing the object touching the component 104 the component 104 can begin operating in a high resolution mode.

The sensing component control module 106 controls the sensing component 104. The sensing component control module 106 determines which areas of the sensing component 104 are to operate in which resolution modes at which times, and activates the resolution modes for the appropriate areas at the appropriate times. The sensing component control module 106 can determine the resolution that an area of the sensing component is to operate in at any given time in a variety of different manners as discussed in more detail below.

The display component 108 is a display screen or display device. The display component 108 allows a user interface (UI), content, other information, and so forth to be displayed to a user of the device 102. The display component 108 and the sensing component 104 can be implemented together to form a touch display structure. The components 108 and 104 can be implemented together in various manners, such as the sensing component 104 being situated on top of the display component 108, with the UI, content, or other information displayed by the component 108 displaying and being visible to a user of the device 102 through the sensing component 104. The sensing component 104 senses objects touching the component 104, allowing the user of the device 102 to interact with icons and other content or information displayed on the display component 108. Alternatively, the sensing component 104 can be situated below the display component 108, in which case an object touching the top of the touch display structure is sensed by the sensing component 104 through the display component 108.

The display control module 110 manages display of the UI, content, or other information on the display component 108. The UI includes various elements, referred to as icons, that are displayed to users and represent functionality of the device 102 (or another device that the device 102 is coupled to). Management of the display of the UI can include determining where icons are displayed on the display component 108, such as in different regions as discussed in more detail below.

The fingerprint characteristics sensing module 112 receives the fingerprint data, also referred to as the sensed fingerprint data, that is sensed by the sensing component 104. In one embodiment, this fingerprint data is an indication of the locations where different portions of the surface of the finger are sensed as protruding further than other portions, these protruding portions resulting in the fingerprint's pattern. The locations can be identified in various different manners, such as using a 2-dimensional Cartesian coordinate system in which the locations where protrusions are sensed are identified (e.g., a grid or matrix of values corresponding to sensor locations can be used, with one value (e.g., a value of 1) in the grid or matrix indicating a protrusion is sensed at the corresponding location, and another value (e.g., a value of 0) in the grid or matrix indicating a protrusion is not sensed at the corresponding location). Alternatively, other coordinate systems can be used, such as Polar coordinate systems, proprietary coordinate systems, and so forth.

The fingerprint characteristics sensing module 112 identifies, based on the sensed fingerprint data, various finger characteristics of one or more of the user's fingers sensed by the sensing component 104. These finger characteristics can include, for example, the general shape of the fingers (e.g., the lengths and widths of the fingers relative to one another), the locations of boundaries between fingers, the locations of minutiae in a fingerprint relative to the locations of other minutiae in the same fingerprint, the locations of minutiae in a fingerprint relative to the locations of minutiae in one or more other fingerprints, and so forth.

Various data regarding the user's finger characteristics is stored in the memory device 116, which can be volatile and/or nonvolatile memory (e.g., RAM, Flash memory, magnetic disk, etc.), as authentication data 118. The authentication data 118 includes data indicating one or more correct or representative finger characteristic samples for a user. Finger characteristic samples can be stored as part of the authentication data 118 during an enrollment process, which refers to a process during which the user is setting up or initializing the device 102 to authenticate his or her fingerprint. Finger characteristic samples can also be stored at other times, such as in response to a user being authenticated using the techniques discussed herein. For example, each time the user is successfully authenticated, the finger characteristics sensed during that authentication process can be combined (e.g., averaged) with the previously stored authentication data.

The fingerprint characteristics sensing module 112 generates data identifying the finger characteristics and makes the generated data available to the user authentication module 114. The user authentication module 114 analyzes the finger characteristics identified by the module 112 and compares the identified characteristics to one or more stored finger characteristic samples maintained as part of the authentication data 118. Based on this comparison, the finger authentication module 114 determines whether the finger characteristics identified by the module 112 satisfy the authentication data 118. If the finger characteristics satisfy the authentication data (e.g., the finger characteristics match stored finger characteristics data), then the user authentication succeeds and the user is authenticated. However, if the finger characteristics do not satisfy the authentication data (e.g., the finger characteristics do not match stored finger characteristics data), then the user authentication fails and the user is not authenticated.

The user authentication module 114 can make this comparison in different manners in accordance with various different embodiments. In one embodiment, the authentication module 114 compares the finger characteristics identified by the sensing module 112 to the authentication data 118 and determines whether the identified finger characteristics match stored finger characteristics data for the user.

The authentication module 114 can determine whether two sets or samples of finger characteristics (e.g., finger characteristics identified by the sensing module 112 and finger characteristics stored as the authentication data 118) match in various different manners. In one embodiment, the finger characteristics (e.g., locations of minutiae, pattern(s), finger widths, relative finger lengths) in the two finger characteristics samples are compared. If a number of corresponding finger characteristics in the two finger characteristics satisfies (e.g., is equal to and/or greater than) a threshold value then the two finger characteristics samples match; otherwise, the two finger characteristics samples do not match. The number of corresponding finger characteristics in the two finger characteristics samples can be, for example, a number of corresponding locations in the two finger characteristics samples where minutiae are located, a number of finger widths or lengths, and so forth. In another embodiment, rather than relying on whether the number of corresponding finger characteristics in the two finger characteristics satisfies a threshold value, various public and/or proprietary pattern matching techniques can be used to compare patterns in the two finger characteristics samples (e.g., patterns of minutiae) and determine whether the two finger characteristics samples match.

It should be noted that user authentication can be performed by the device 102 for its own use and/or used by another system or device. For example, the user authentication module 114 can authenticate a user in order to allow the user to access the device 102 itself, programs or applications running on the device 102, other modules or components of the device 102, and so forth. Alternatively, the module 114 can authenticate a user in order to allow the user to access another system or device coupled to the device 102, another system or device accessed by the device 102 via the Internet or other network, and so forth.

It should also be noted that the sensing component 104 can operate in different resolution modes as discussed above, and that not all of these resolution modes may sense fingerprint data. For example, the sensing component may operate in a high resolution mode that senses fingerprint data, and a low resolution mode that does not sense fingerprint data. Furthermore, different resolution modes of the sensing component 104 may be able to sense different details regarding an objecting and thus provide different amounts of fingerprint data. For example, the sensing component 104 may operate in a high resolution mode or a medium resolution mode, and may provide fingerprint data to the fingerprint characteristics sensing module 112 in both of these modes. However, a larger amount of fingerprint data may be provided to the fingerprint characteristics sensing module 112 when the sensing component 104 is operating in the high resolution mode than in the medium resolution mode. The amount of fingerprint data provided to the fingerprint characteristics sensing module 112 can affect whether the user authentication module 114 can authenticate a user and/or the accuracy of the authentication. Generally, larger amounts of fingerprint data lead to increased ability to authenticate a user and increased accuracy of the authentication.

Figure 2:
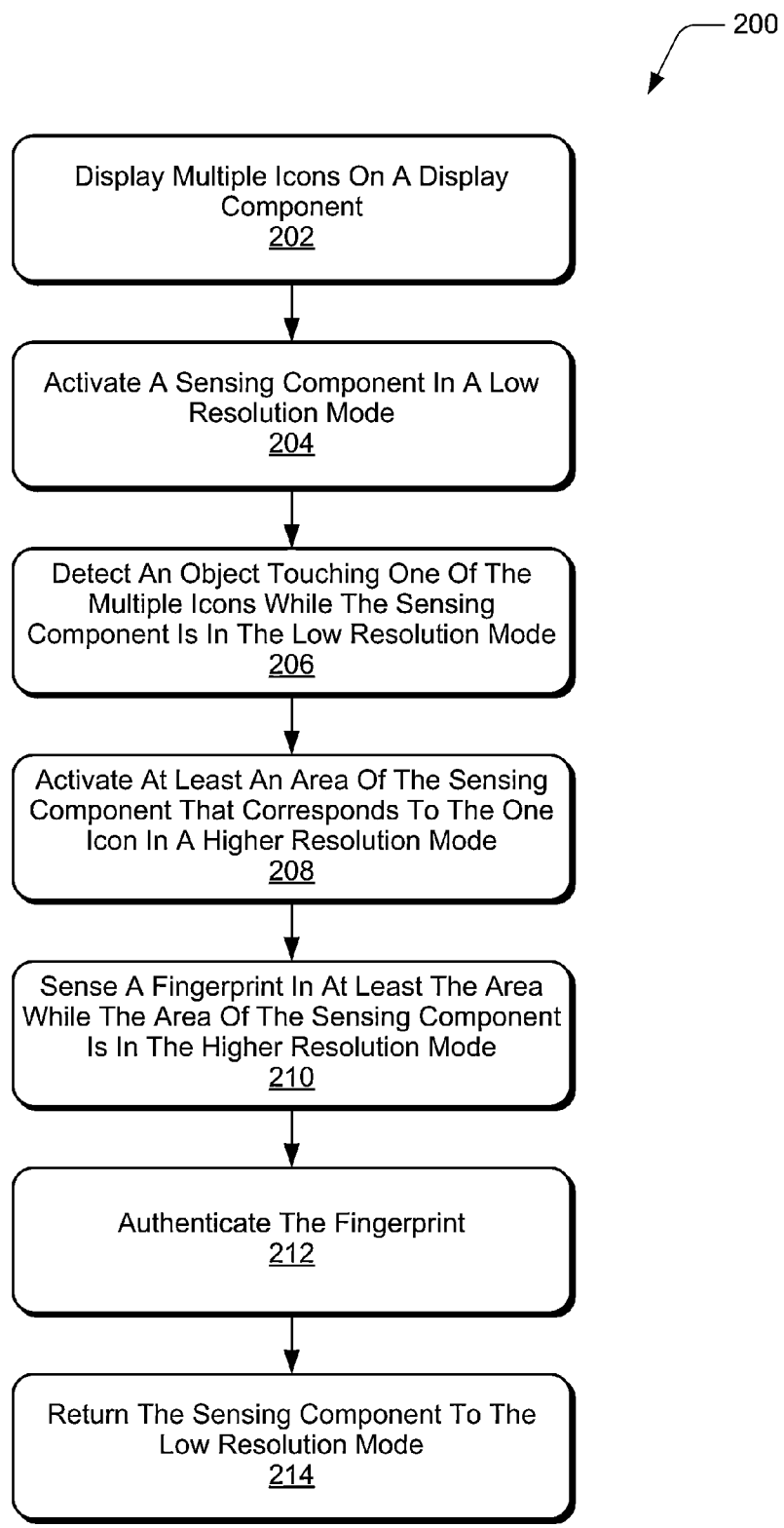
FIG. 2 illustrates an example process implementing the adaptive sensing component resolution based on touch location in accordance with one or more embodiments.

FIG. 2 illustrates an example process 200 implementing the adaptive sensing component resolution based on touch location in accordance with one or more embodiments. Process 200 is implemented by one or more devices, such as by the device 102 of FIG. 1. Process 200 can be implemented in software, firmware, hardware, or combinations thereof. Process 200 is shown as a set of acts and is not limited to the order shown for performing the operations of the various acts. Process 200 is an example of implementing the adaptive sensing component resolution based on touch location; additional discussions of implementing the adaptive sensing component resolution based on touch location are included herein with reference to different FIGS.

Process 200 is discussed with reference to FIGS. 3-8, which illustrate examples of devices 102 implementing the adaptive sensing component resolution based on touch location discussed herein. The examples in FIGS. 3-8 illustrate a sensor component 104 overlaying a display component, the sensor component 104 being illustrated as a sensing grid of column lines and row lines. Although illustrated as a grid overlaying a display component in the examples of FIGS. 3-8, the sensor component 104 can alternatively be implemented in other manners as discussed above. Additionally, although the grid is illustrated in FIGS. 3-8, it should be noted that the grid may not be (but alternatively can be) visible to the user of the device 102. The sensor component 104 operates as a conventional touchscreen (e.g., allowing selection of icons and other interaction with the displayed user interface) as well as a fingerprint sensor.

In process 200, multiple icons are displayed on a display component (act 202). These multiple icons can represent various functionality as discussed above. For example, the device 102 of FIG. 3 displays an icon 302, an icon 304, and an icon 306. The icon 302 includes a telephone handset, and represents telephone functionality of the device 102. The icon 304 includes an envelope, and represents electronic mail and/or messaging functionality of the device 102. The icon 306 includes a bank building, and represents a banking application (e.g., allowing a user to access his or her bank account) that can run on the device 102. It should be noted that the icons 302, 304, and 306 are examples, and that various other icons representing various other functionality can alternatively and/or additionally be displayed by the device 102. The functionality represented by displayed icons can be implemented by the device 102 in software, firmware, hardware, or combinations thereof.

Returning to FIG. 2, the sensing component is activated in a low resolution mode (act 204). In the low resolution mode, the sensing component can sense a relatively small number of dots per inch. In the example device 102 of FIG. 3, the sensing component 104 is operating in a low resolution mode, illustrated by a low density of column and row grid lines. Although the sensing component is in the low resolution mode, the low resolution mode is sufficient to sense an object touching one of the icons 302-306, as well as sense which of the icons 302-306 is touched.

An object touching one of the multiple icons while the sensing component is in the low resolution mode is detected (act 206). The display component displays an icon in a particular portion of the display content. An object touching an icon refers to an object touching part of a top layer of a touch display structure including (or layered on top of) the display component that displays the icon, the object touching the part of the top layer that corresponds to (is situated over) the icon.

Various actions can be taken in response to detecting an object touching an icon. For functionality associated with some icons, user authentication is to be performed. Different functionality can use different user authentication levels (e.g., a particular accuracy of the authentication that is to be achieved), and thus different resolutions that the sensing component is to operate in to achieve the appropriate accuracy of the authentication. For example, the banking application functionality represented by the icon 306 of FIG. 3 may have a particular authentication accuracy that is greater than the authentication accuracy for the electronic mail and/or messaging functionality represented by the icon 304.

Thus, in response to detecting an object touching an icon, the sensing component control module 106 of FIG. 1 can change the resolution mode that the sensing component 104 is operating in, activating a different resolution mode for the sensing component 104. The resolution mode that is to be activated can be determined by the sensing component control module 106 in different manners. In one embodiment, an icon includes (e.g., in data describing the icon or metadata) a security setting that indicates a resolution mode to use for the icon (a resolution mode to be activated in order to sense fingerprint data to authenticate the user to use the functionality represented by the icon). This indication can take various forms, such as specifying a particular resolution mode (e.g., high resolution or medium resolution), specifying a particular numeric value (e.g., a particular number of dots per inch the resolution mode is to support), and so forth.

Alternatively, the resolution mode can be determined in other manners, such as by the sensing component control module 106 of FIG. 1. For example, the high resolution mode of the sensing component may automatically be activated in response to any icon being touched, or any of a particular subset of icons being touched (e.g., any icons corresponding to functionality for which user authentication is to be performed).

An accuracy of user authentication, and thus the resolution mode to activate in response to detecting an object touching an icon, can be defined in various manners. In one embodiment, an application providing the functionality represented by the icon specifies the resolution mode that is to be activated in response to detecting an object touching the icon. This specified resolution mode can optionally be changed by various other components or entities, such as a user of the device 102, contacts of the device, an administrator managing the device 102, a remote service with which the device 102 communicates (e.g., a banking service that a banking application communicates with), and so forth.

It should be noted that some functionality may use no user authentication. In response to detecting an object touching an icon representing such functionality, the resolution of the sensing component need not be (and typically is not) changed. For example, assume that the telephone functionality represented by the icon 302 of FIG. 3 can be used without user authentication. In response to an object touching the icon 302, the sensing component remains in the low resolution mode as illustrated by the device 102 of FIG. 4. The icon 302 is illustrated in FIG. 4, although the icons 304 and 306 are not illustrated to show that the telephone functionality has been selected by touching the icon 302.

However, in response to detecting an object touching an icon representing functionality that does use user authentication, at least an area of the sensing component that corresponds to the touched icon is activated in a higher resolution mode (act 208). The higher resolution mode refers to a higher resolution mode than the low resolution mode illustrated in FIG. 3. Which particular resolution mode (e.g., of multiple resolution modes that are higher resolution than the low resolution mode) is activated can be determined in different manners, as discussed above.

In one embodiment, the area of the sensing component that is activated in the higher resolution mode is substantially all of the sensing component. Although some portions of the sensing component may not be activated in the higher resolution mode (e.g., portions around the edges of the sensing component), all or at least almost all of the sensing component is activated in the higher resolution. For example, assume that the electronic mail and/or messaging functionality represented by the icon 304 of FIG. 3 uses user authentication for which a medium resolution mode is used. In response to an object touching the icon 304, the sensing component is activated in the medium resolution mode as illustrated by the device 102 of FIG. 5. The icon 304 is illustrated in FIG. 5, although the icons 302 and 306 are not illustrated to show that the electronic mail and/or messaging functionality has been selected by touching the icon 304. Substantially all of the sensing component 104 is activated in the higher resolution mode, which in the example of FIG. 5 is a medium resolution mode. The sensing component 104 operating in the medium resolution mode is illustrated by a medium density of column and row grid lines, which is higher density than illustrated by the column and grid lines in FIG. 3.

By way of another example, assume that the banking application represented by the icon 306 of FIG. 3 uses user authentication for which a high resolution mode is used. In response to an object touching the icon 306, the sensing component is activated in the high resolution mode as illustrated by the device 102 of FIG. 6. The icon 306 is illustrated in FIG. 6, although the icons 302 and 304 are not illustrated to show that the banking application has been selected by touching the icon 306. Substantially all of the sensing component 104 is activated in the higher resolution mode, which in the example of FIG. 6 is a high resolution mode. The sensing component 104 operating in the high resolution mode is illustrated by a high density of column and row grid lines, which is higher density than illustrated by the column and grid lines in FIG. 5.

In another embodiment, rather than activating substantially all of the sensing component, the area of the sensing component that is activated in the higher resolution mode in act 208 is a portion of the sensing component that corresponds to the touched icon. The portion of the sensing component that corresponds to the touched icon is the portion of the sensing component that is over (or close to being over) the touched icon. The portion of the sensing component that is over a touched icon refers to the grid lines that pass over the touched icon, or other dots or points that pass over or are otherwise situated over the touched icon. The portion of the sensing component that is close to being over the touched icons refers to the grid lines that are within a threshold distance of passing over the touched icon, or other dots or points that pass over or are otherwise situated within a threshold distance of being over the touched icon. Although referred to herein as a portion being over or close to being over a touched icon, in situations in which the sensing component is implemented in a layer below the display component, the portion of the sensing component can analogously be below (or close to being below) the touched icon.

Figure 7:
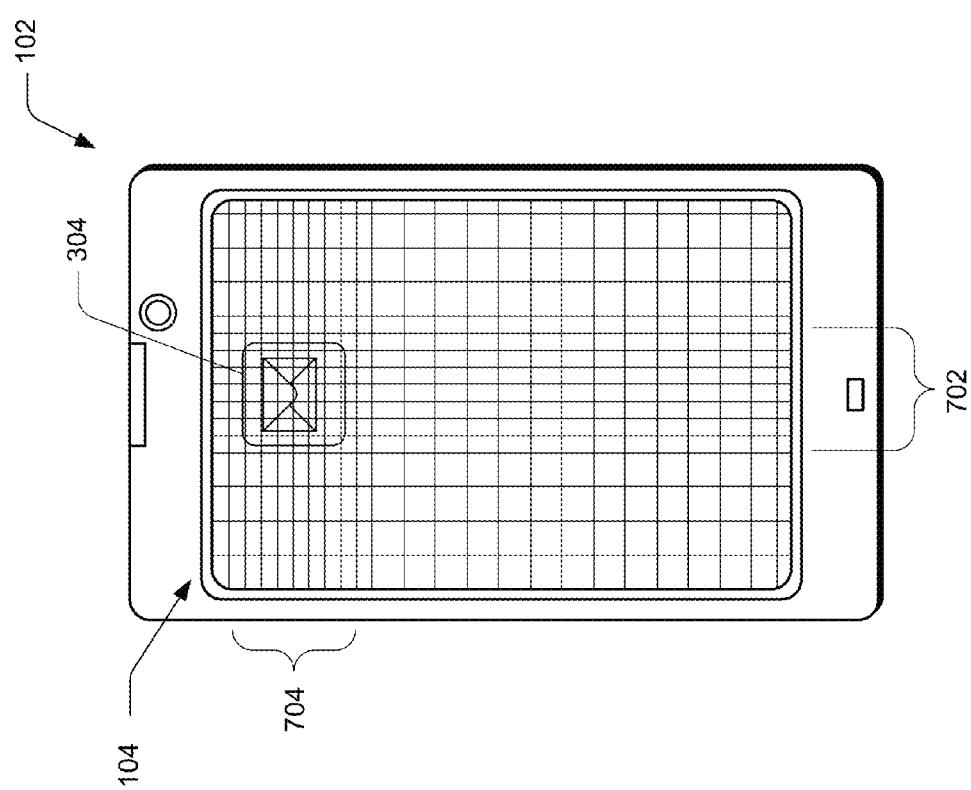

For example, assume that the electronic mail and/or messaging functionality represented by the icon 304 of FIG. 3 uses user authentication for which a medium resolution mode is used. In response to an object touching the icon 304, the area of the sensing component that corresponds to the icon 304 is activated in the medium resolution mode as illustrated by the device 102 of FIG. 7. The icon 304 is illustrated in FIG. 7, although the icons 302 and 306 are not illustrated to show that the electronic mail and/or messaging functionality has been selected by touching the icon 304. The area of the sensing component 104 that is activated is the portion of the sensing component 104 including the column lines 702 and the row lines 704 of a sensing grid passing over (or close to passing over) the icon 304. The area of the sensing component 104 operating in the medium resolution mode is illustrated by a medium density of column lines 702 and row lines 704, which is higher density than illustrated by the column lines and row lines of other areas of the sensing component 104 in FIG. 7.

Figure 8:
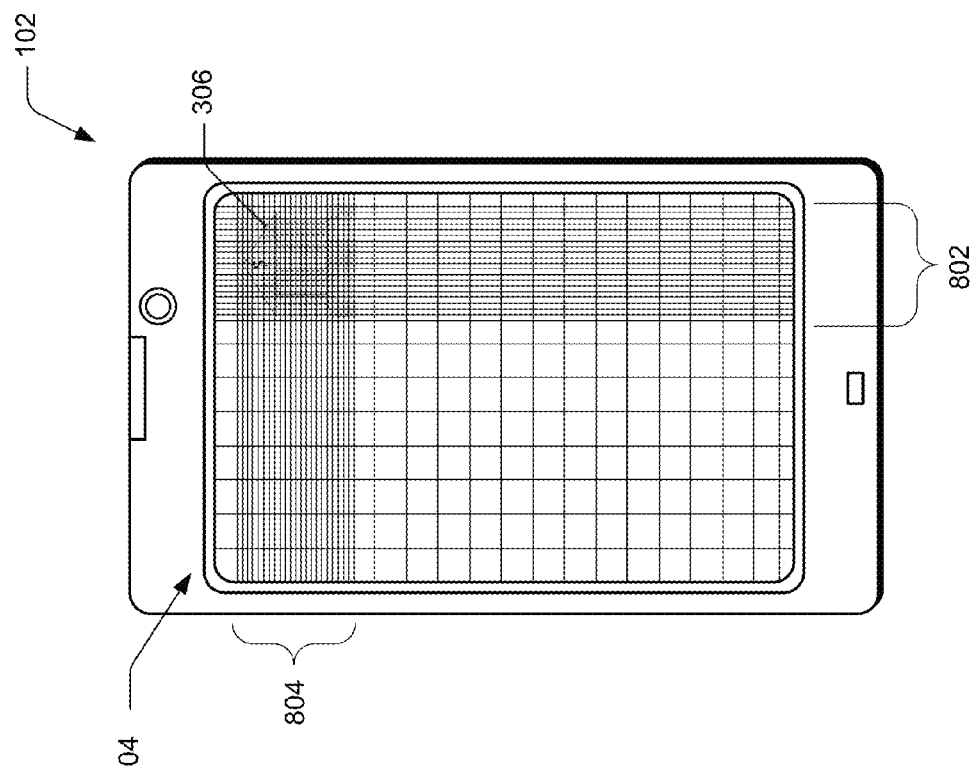

By way of another example, assume that the banking application represented by the icon 306 of FIG. 3 uses user authentication for which a high resolution mode is used. In response to an object touching the icon 306, the area of the sensing component that corresponds to the icon 306 is activated in the high resolution mode as illustrated by the device 102 of FIG. 8. The icon 306 is illustrated in FIG. 8, although the icons 302 and 304 are not illustrated to show that the banking application has been selected by touching the icon 306. The area of the sensing component 104 that is activated is the portion of the sensing component 104 including the column lines 802 and the row lines 804 of a sensing grid passing over (or close to passing over) the icon 306. The area of the sensing component 104 operating in the high resolution mode is illustrated by a high density of column lines 802 and row lines 804, which is higher density than illustrated by the column lines and row lines of other areas of the sensing component 104 in FIG. 8.

When an area of the sensing component 104 is operating in a higher resolution mode (e.g., the high resolution mode illustrated in FIG. 8 or the medium resolution mode illustrated in FIG. 9), other areas of the sensing component 104 can operate in a different resolution mode (e.g., the low resolution mode). Alternatively, other areas of the sensing component 104 can be deactivated. An area being deactivated refers to the area being unable to sense an object touching the area. The manner in which an area of a sensing component is deactivated can vary based on the manner in which the sensing component 104 is implemented. For example, if the sensing component 104 is a grid of drive lines and sense lines, an area can be deactivated by deactivating (not driving) current on the drive lines that pass through that area, and by not powering (deactivating) sensing circuitry to sense current on the sense lines that pass through that area.

Returning to FIG. 2, a fingerprint is sensed in at least the area of the sensing component while the area of the sensing component is in the higher resolution mode (act 210). The fingerprint is sensed by the fingerprint characteristics sensing module 112 of FIG. 1 identifying, based on the sensed fingerprint data, various finger characteristics of one or more of the user's fingers sensed by the sensing component 104 as discussed above.

The sensed fingerprint is authenticated (act 212). The sensed fingerprint is authenticated by the user authentication module 114 of FIG. 1 analyzing the finger characteristics identified in act 210 and comparing the identified characteristics to one or more stored finger characteristic samples maintained as part of the authentication data 118 as discussed above. The authentication in act 212 can result in a successful authentication (e.g., and the user is permitted access to the functionality represented by the icon) or an unsuccessful authentication (e.g., and the user is denied access to the functionality represented by the icon).

The sensing component is also returned to the low resolution mode (act 214). The sensing component can be returned to the low resolution mode in response to the user fingerprint being successfully authenticated. Alternatively, the sensing component can be returned to the low resolution mode at other times or in response to other events, such as after a threshold amount of time elapses without the user authentication module 114 being able to successfully authenticate the fingerprint, in response to the user authentication module 114 indicating that the module 114 cannot successfully authenticate the fingerprint, in response to the icon no longer being touched (e.g., keeping the area of the sensing component in the higher resolution mode while the object is touching the icon), and so forth.

Thus, with reference to process 200 of FIG. 2, the sensing component operates in the low resolution mode until an object touches one of the displayed icons, and in response to the touch the sensing component can begin operating in the higher resolution mode. The sensing component adapts to the object touching one of the displayed icons, activating at least an area of the sensing component that corresponds to the touched icon at a higher resolution mode appropriate for the touched icon. After a fingerprint is authenticated, the sensing component can return to operating in the low resolution mode. The sensing component thus operates in different resolution modes at different times.

It should be noted that in the examples of FIGS. 3-8, the icons 302-306 are illustrated as being displayed in particular locations on the display component. These different locations are examples, and the icons 302-306 can be displayed anywhere on the display component and can be moved to different locations on the display component by the user (e.g., by dragging and dropping an icon). The sensing component control module 106 of FIG. 1 can be aware of the locations of the icons (e.g., via communication with the display control module 110). Thus, if an icon is moved to a new location on the display component and is touched at that new location, the sensing component control module 106 can activate a higher resolution mode for the appropriate area of the sensing component 104 that corresponds to the touched icon at its new location.

Figure 9:
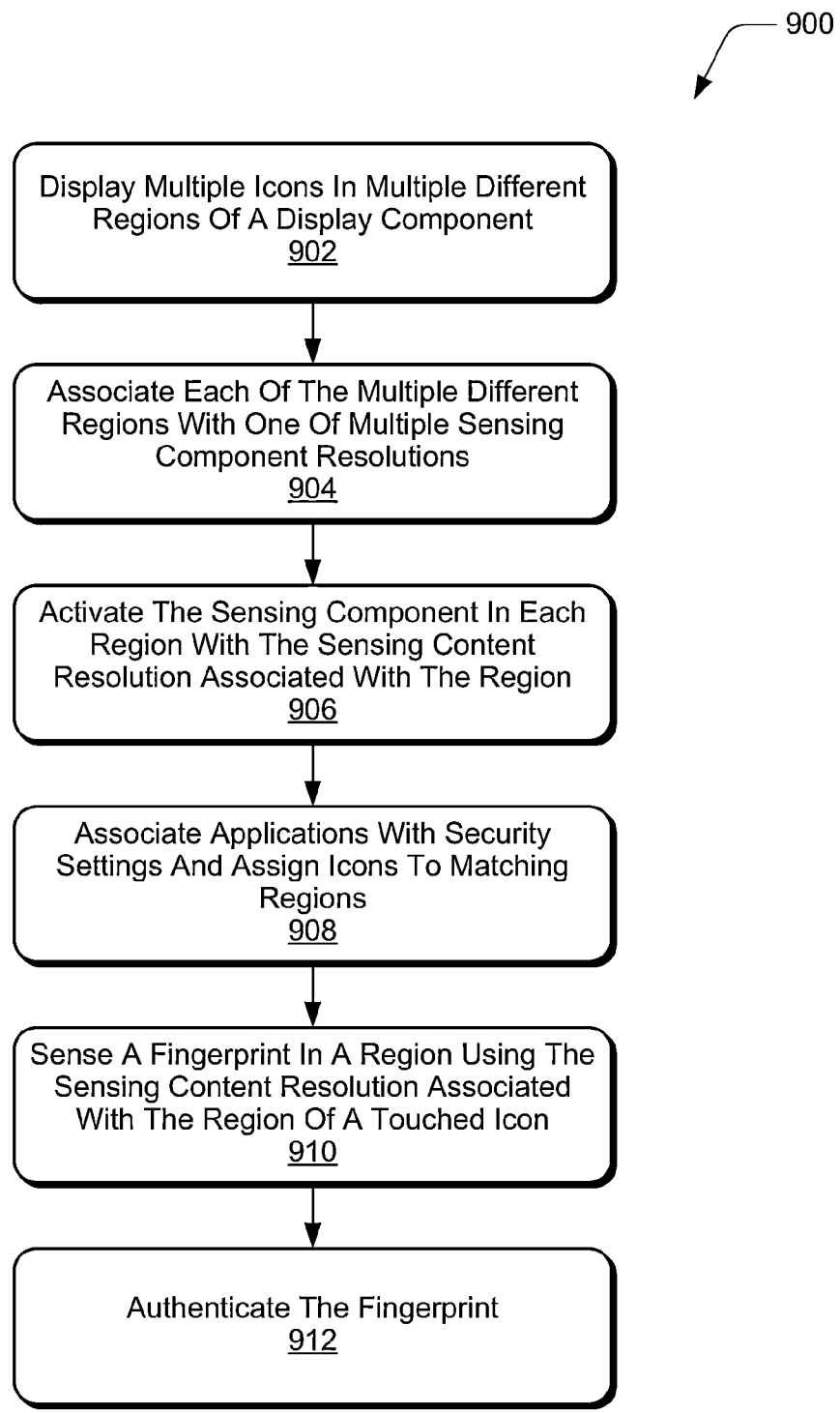
FIG. 9 illustrates another example process implementing the adaptive sensing component resolution based on touch location in accordance with one or more embodiments.

FIG. 9 illustrates another example process 900 implementing the adaptive sensing component resolution based on touch location in accordance with one or more embodiments. Process 900 is implemented by one or more devices, such as by the device 102 of FIG. 1. Process 900 can be implemented in software, firmware, hardware, or combinations thereof. Process 900 is shown as a set of acts and is not limited to the order shown for performing the operations of the various acts. Process 900 is an example of implementing the adaptive sensing component resolution based on touch location; additional discussions of implementing the adaptive sensing component resolution based on touch location are included herein with reference to different FIGS.

Figure 11:
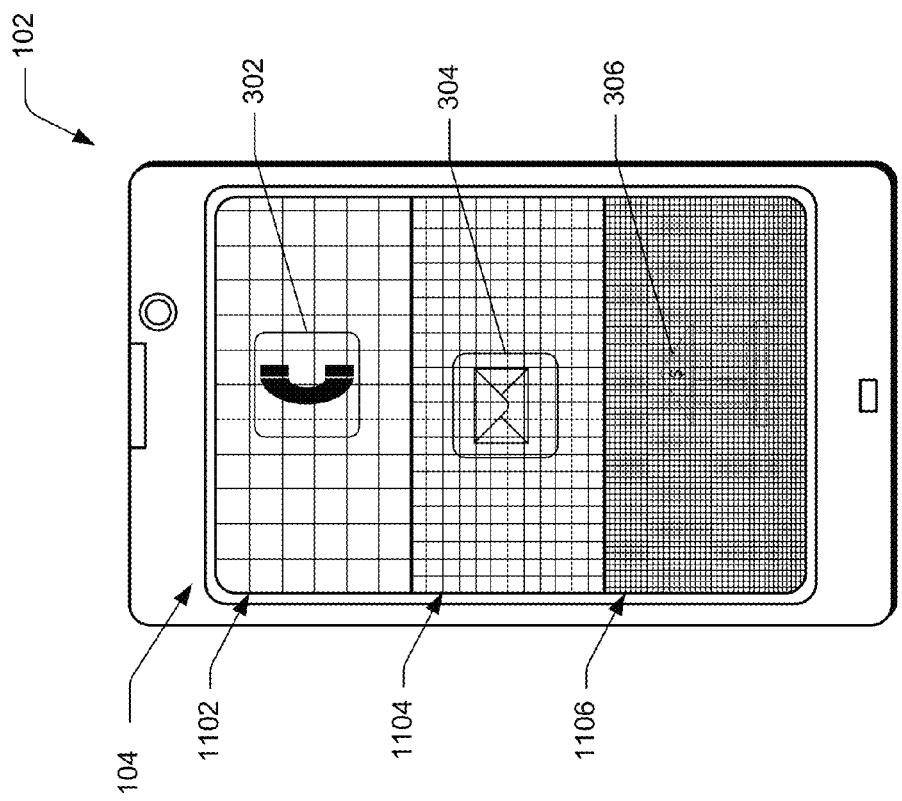
FIGS. 10 and 11 illustrate additional examples of devices implementing the adaptive sensing component resolution based on touch location discussed herein.
Figure 10:
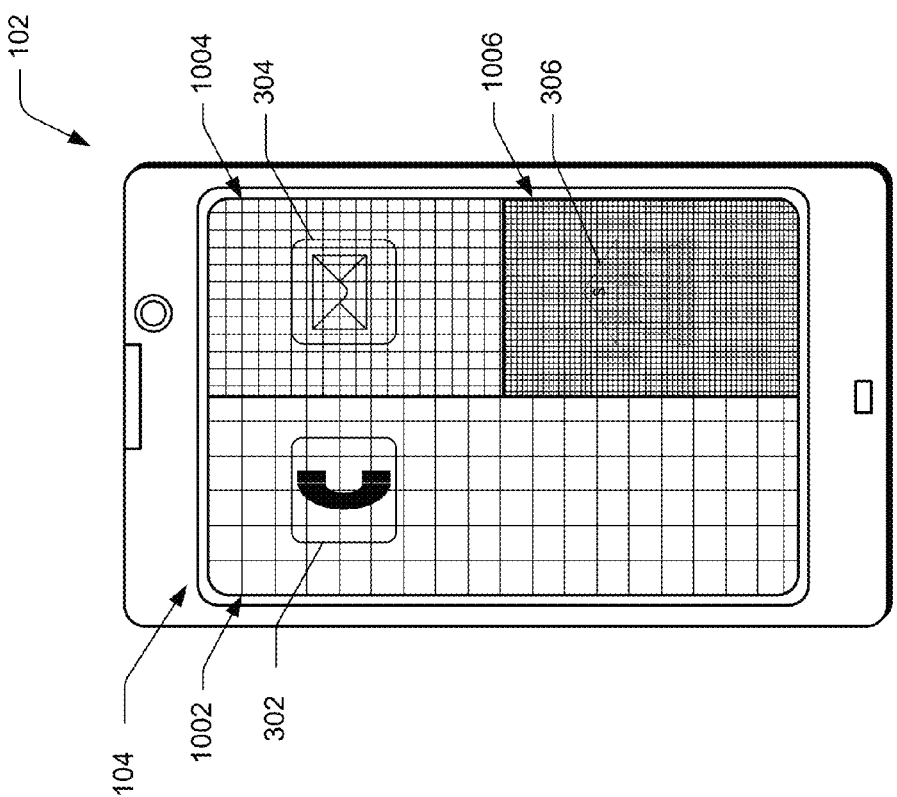

Process 900 is discussed with reference to FIGS. 10 and 11, which illustrate examples of devices 102 implementing the adaptive sensing component resolution based on touch location discussed herein. The examples in FIGS. 10 and 11 illustrate a sensor component 104 overlaying a display component, the sensor component 104 being illustrated as a sensing grid of column lines and row lines. Although illustrated as a grid overlaying a display component in the examples of FIGS. 10 and 11, the sensor component 104 can alternatively be implemented in other manners as discussed above. Additionally, although the grid is illustrated in FIGS. 10 and 11, it should be noted that the grid may not be (but alternatively can be) visible to the user of the device 102. The sensor component 104 operates as a conventional touchscreen (e.g., allowing selection of icons and other interaction with the displayed user interface) as well as a fingerprint sensor.

In process 900, multiple icons are displayed in different regions of a display component (act 902). These multiple icons can represent various functionality as discussed above. For example, the device 102 of FIG. 10 displays the icon 302 that represents telephone functionality, the icon 304 that represents electronic mail and/or messaging functionality, and the icon 306 that represents a banking application. It should be noted that the icons 302, 304, and 306 are examples, and that various other icons representing various other functionality can alternatively and/or additionally be displayed by the device 102.

The different regions of the display component are different portions of the display component. Although examples are illustrated with the regions being rectangular in shape, the regions can be any of a variety of shapes (e.g., regular or irregular geometric shapes) and can be any of a variety of sizes. Different regions on a device 102 can be the same shape and size, or alternatively different sizes.

Each of the multiple different regions is associated with one of multiple sensing component resolutions (act 904). Which regions of the display component are associated with which sensing component resolutions can be determined in various manners, such as by a developer of the device 102 or an operating system of the device 102, by a user of the device 102, by an administrator that manages the device 102, and so forth. Different regions of the same device 102 can be associated with the same sensing component resolution.

For each of the multiple different regions of the display component, the corresponding part or region of the sensing component is activated with the sensing component resolution associated with the region (act 906). The sensing component resolution is thus associated with the region of the display component, and the corresponding part or region of the sensing component. The part or region of the sensing component that corresponds to a region of the display component is the part or region of the sensing component that is on top of (or alternatively below) the corresponding region of the display component in a touch display structure.

The device 102 of FIG. 10 shows a display component having three icons, and three corresponding regions 1002, 1004, and 1006 of the sensing component 104. The region 1002 is approximately the left half of the sensing component 104, the region 1004 is approximately the top right quarter of the sensing component 104, and the region 1006 is approximately the bottom right quarter of the sensing component 104. The sensing component 104 is operating in a low resolution mode in the region 1002, illustrated by a low density of column and row grid lines. The sensing component 104 is operating in a medium resolution mode in the region 1004, illustrated by a medium density of column and row grid lines (which is higher density than illustrated by the column and grid lines in the region 1002). The sensing component 104 is operating in a high resolution mode in the region 1006, illustrated by a high density of column and row grid lines (which is higher density than illustrated by the column and grid lines in the region 1004).

The device 102 of FIG. 11 shows a display component having three icons, and three corresponding regions 1102, 1104, and 1106 of the sensing component 104. The region 1102 is approximately the top third of the sensing component 104, the region 1104 is approximately the middle third of the sensing component 104, and the region 1106 is approximately the bottom third of the sensing component 104. The sensing component 104 is operating in a low resolution mode in the region 1102, illustrated by a low density of column and row grid lines. The sensing component 104 is operating in a medium resolution mode in the region 1104, illustrated by a medium density of column and row grid lines (which is higher density than illustrated by the column and grid lines in the region 1102). The sensing component 104 is operating in a high resolution mode in the region 1106, illustrated by a high density of column and row grid lines (which is higher density than illustrated by the column and grid lines in the region 1104).

For functionality represented by some icons, user authentication is to be performed, and different functionality can use different user authentication levels (and thus different resolutions that the sensing component is to operate in to achieve the appropriate accuracy of the authentication) as discussed above. For example, the banking application functionality represented by the icon 306 of FIG. 3 may have a particular authentication accuracy that is greater than the authentication accuracy for the electronic mail and/or messaging functionality represented by the icon 304.

Each icon is assigned to one of the regions of the display component (act 908). Applications are associated with a particular security setting that identifies a resolution to be used in sensing a fingerprint or an accuracy of authentication used by the application. Icons are grouped in a region of the display that matches their resolution or security setting, such as low resolution icons in a low resolution region. Thus, the region to which an icon is assigned is based on the authentication level used by the represented functionality, and therefore the resolution mode to use for sensing fingerprint data (if any) for an object touching the icon. An icon is assigned to a region of the display component that is associated with a sensing component resolution that is the same as (or at least as high as) the resolution mode to use for sensing fingerprint data (if any) for an object touching the icon.

For example, assume that the telephone functionality represented by the icon 302 can be used without user authentication, that the accuracy of user authentication to be performed for the electronic mail and/or messaging functionality represented by the icon 304 is provided by the medium resolution mode, and that the accuracy of user authentication to be performed for the banking application represented by the icon 306 is provided by the high resolution mode. In this example, in FIG. 10 the icon 302 is assigned to the region 1002 operating in a low resolution mode, the icon 304 is assigned to the region 1004 operating in a medium resolution mode, and the icon 306 is assigned to the region 1006 operating in a high resolution mode. Similarly, in this example, in FIG. 11 the icon 302 is assigned to the region 1102 operating in a low resolution mode, the icon 304 is assigned to the region 1104 operating in a medium resolution mode, and the icon 306 is assigned to the region 1106 operating in a high resolution mode.

An accuracy of user authentication for functionality represented by an icon, and the resolution mode to use to sense fingerprint data when authenticating the user, can be defined in various manners as discussed above (e.g., by an application providing the functionality represented by the icon specifying the resolution mode). The specified accuracy of user authentication (and thus resolution mode to use when sensing fingerprint data), can be determined by the sensing component control module 106 of FIG. 1 in various manners as discussed above (e.g., in a security setting of the icon), based on an application type of the application represented by the icon, and so forth.

This defined accuracy of user authentication or resolution mode can optionally be changed by various components or entities, as discussed above. For example, the user can specify a desired resolution mode for functionality represented by an icon by providing an input that the icon is to be placed in a region associated with the desired resolution mode (e.g., the user can drag and drop the icon into the region associated with the desired resolution mode). The icon can optionally have a threshold resolution mode that indicates an authentication level used by the functionality represented by the icon, and the display control module 110 of FIG. 1 prevents the user from changing the resolution mode to a resolution mode that is lower than the threshold resolution mode (and thus that would not satisfy the authentication level used by the functionality represented by the icon). For example, if the region 1004 had a threshold resolution mode of a medium resolution mode, then the user could drag and drop the icon 304 into the region 1006 to indicate that he or she desires greater accuracy of user authentication, but would be prevented from dragging and dropping the icon 304 into the region 1002 to indicate that he or she desires no user authentication. The threshold resolution mode can be specified in various manners, analogous to defining the accuracy of user authentication for functionality represented by an icon (and the resolution mode to use to sense fingerprint data when authenticating the user) as discussed above.

Returning to FIG. 9, a fingerprint is sensed using the sensing component resolution associated with the region in which the touched icon is displayed (act 910). The fingerprint is sensed in act 910 as the user is touching the icon. The fingerprint is sensed by the fingerprint characteristics sensing module 112 of FIG. 1 identifying, based on the sensed fingerprint data, various finger characteristics of one or more of the user's fingers sensed by the sensing component 104 as discussed above.

The sensed fingerprint is authenticated (act 912). The sensed fingerprint is authenticated by the user authentication module 114 of FIG. 1 analyzing the finger characteristics identified in act 910 and comparing the identified characteristics to one or more stored finger characteristic samples maintained as part of the authentication data 118 as discussed above. The authentication in act 912 can result in a successful authentication (e.g., and the user is permitted access to the functionality represented by the icon) or an unsuccessful authentication (e.g., and the user is denied access to the functionality represented by the icon).

Thus, with reference to process 900 of FIG. 9, icons can be displayed in different regions, and different parts of the sensing component operate in different resolution modes concurrently. When an icon is touched, the sensing component can sense fingerprint data of a finger touching the icon with the resolution associated with the region in which the touched icon is displayed.

By way of example, an application can have an application type that identifies the resolution for the application. Applications having matching types (e.g., the same or similar types) are grouped together in different regions. When a user downloads the application, the application uses a particular resolution (e.g., a low resolution) and the application is downloaded or assigned to a region having that particular resolution (e.g., a low resolution). The settings of the downloaded applications thus result in applications of similar types being grouped together in the same or corresponding regions.

In the embodiments discussed herein, higher sensing component resolutions can be used. Some higher sensing component resolutions can result in situations where a driver component is driving a large number (e.g., thousands) of drive lines, such as in a sensing grid. In one embodiment, the driver component is able to concurrently drive the number of lines dictated by the sensing component resolutions used by the device 102. In this embodiment, the driver component drives the appropriate lines based on which areas or regions of the sensing component are to have which resolution as discussed above.

In another embodiment, the driver component does not concurrently drive the number of lines dictated by the sensing component resolutions used by the device 102. In this embodiment, the driving of drive lines is multiplexed.

Figure 12:
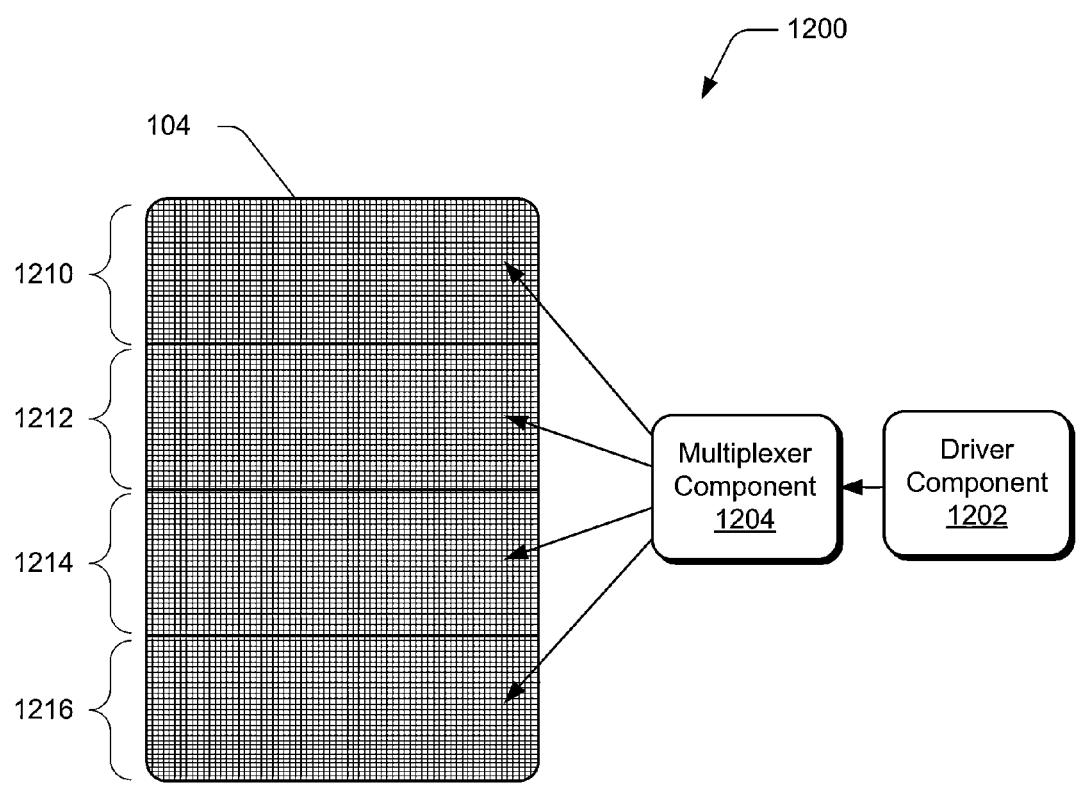
FIGS. 12 and 13 illustrate example systems multiplexing drive lines in accordance with one or more embodiments.

FIG. 12 illustrates an example system 1200 multiplexing drive lines in accordance with one or more embodiments. The system 1200 includes a driver component 1202, a multiplexer component 1204, and the sensing component 104. The sensing component 104 is a sensing grid with rows of drive lines. The sensing component 104 is separated into four parts 1210, 1212, 1214, and 1216, with the rows of drive lines of the sensing component 104 being grouped into one of the four parts. The driver component 1202 provides signals to drive the drive lines of the sensing component 104, and the multiplexer component 1204 multiplexes those signals to the different parts 1210-1216, providing the signals to different ones of parts 1210-1216 at different times. Thus, different parts of the sensing component 104 are activated at different times. For example, the multiplexer component 1204 provides the signals to part 1210 for an amount of time, then to part 1212 for an amount of time, then to part 1214 for an amount of time, then to part 1216 for an amount of time, then to part 1210 for an amount of time, and so forth. The multiplexer component 1204 multiplexes the signals quickly enough so that user inputs (e.g., touches) can be provided to the sensing component 104 and responded to with little if any delay in response that is noticeable to a user of the device 102. For example, the multiplexer component 1204 can multiplex the signals so that each of parts 1210-1216 receives the signals for approximately 25 milliseconds every 100 milliseconds. However, it should be noted that these values are an example, and other values can alternatively be used.

Figure 13:
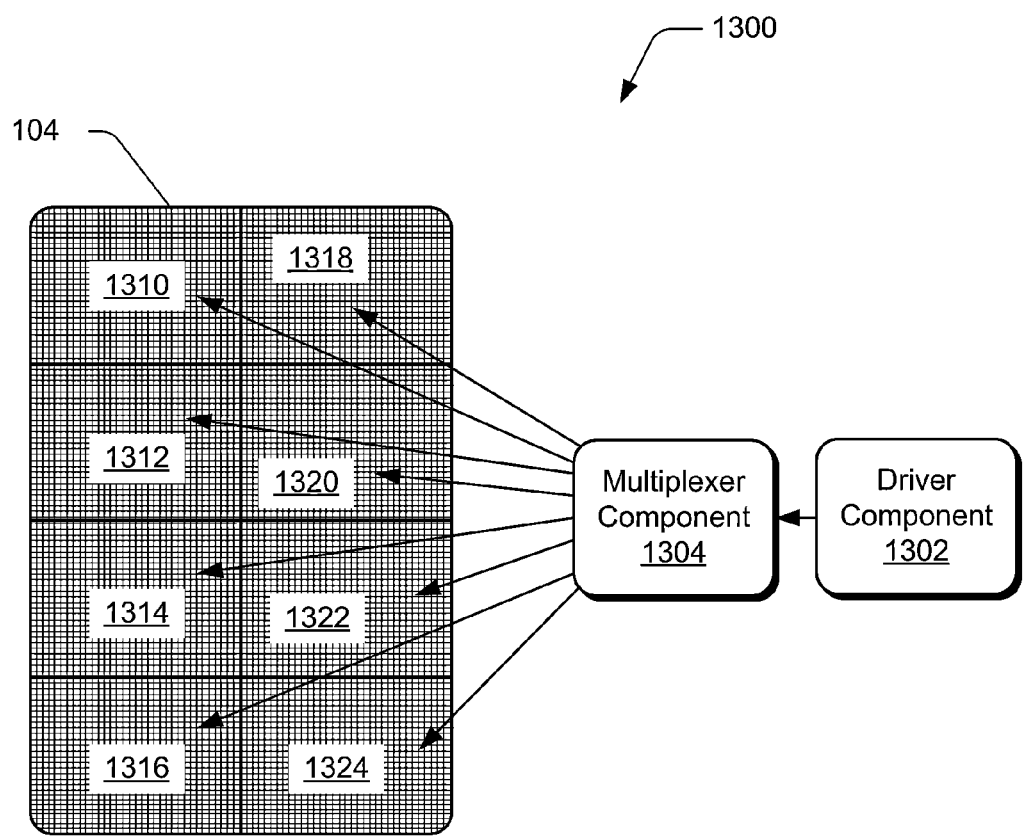

FIG. 13 illustrates an example system 1300 multiplexing drive lines in accordance with one or more embodiments. The system 1300 includes a driver component 1302, a multiplexer component 1304, and the sensing component 104. The sensing component 104 is a sensing grid with rows of drive lines. The sensing component 104 is separated into eight parts 1310, 1312, 1314, 1316, 1318, 1320, 1322, and 1324, with the rows of drive lines of the sensing component 104 being grouped into one of the eight parts. The driver component 1302 provides signals to drive the drive lines of the sensing component 104, and the multiplexer component 1304 multiplexes those signals to the different parts 1310-1324, providing the signals to different ones of parts 1310-1324 at different times. Thus, different parts of the sensing component 104 are activated at different times. For example, the multiplexer component 1304 provides the signals to part 1310 for an amount of time, then to part 1312 for an amount of time, then to part 1314 for an amount of time, then to part 1316 for an amount of time, then to part 1318 for an amount of time, then to part 1320 for an amount of time, then to part 1322 for an amount of time, then to part 1324 for an amount of time, then to part 1310 for an amount of time, and so forth. The multiplexer component 1304 multiplexes the signals quickly enough so that user inputs can be provided to the sensing component 104 and responded to with little if any delay in response that is noticeable to a user of the device 102. For example, the multiplexer component 1304 can multiplex the signals so that each of parts 1310-1324 receives the signals for approximately 12.5 milliseconds every 100 milliseconds. However, it should be noted that these values are an example, and other values can alternatively be used.

Despite the multiplexing of drive lines illustrated in the systems 1200 and 1300, the driver components 1202 and 1302 still drive the number of lines dictated by the sensing component resolutions used by the device 102. Drive lines for the appropriate areas of the sensing component 104 are activated at higher resolutions at the appropriate times as discussed above. Any of various components (such as the driver component 1202 or 1302) can readily determine, based on which areas of the sensing component 104 are to be activated at any given time as well as the manner in which the signals from the driver component 1202 or 1302 are multiplexed by the multiplexor component 1204 or 1304, which signals to drive at which times so that the appropriate drive lines of the sensing component 104 are driven at the appropriate times.

In the discussions above, reference is made to sensing a fingerprint while a finger is touching an icon. It should be noted that situations can arise where fingerprint data for multiple fingers is sensed by the sensing component 104. Such situations can arise in various manners, such as after an initial user authentication is performed (e.g., in response to a user touching an icon) for functionality that desires further authentication in the form of additional fingerprints. When sensing multiple fingerprints, the sensing component 104 can sense the fingerprint data for the multiple fingerprints serially or in a serial mode (e.g., one fingerprint after the other), or alternatively in parallel or in a parallel mode (e.g., the multiple fingerprints concurrently). The areas of the sensing component 104 that the multiple fingers are touching can be sensed while the sensing component is operating in a low resolution mode, and those areas of the sensing component 104 can then be activated in a higher resolution mode to sense the fingerprints. Alternatively, an indication can be provided to the user to place his or her fingers on a particular portion of the sensing component 104 (e.g., in a region operating in a high resolution mode, such as the region 1006 of FIG. 10 or the region 1106 of FIG. 11), or substantially all of the sensing component 104 can be activated in a higher resolution mode.

Thus, using the techniques discussed herein, the user is authenticated on demand, as he or she uses the device 102. No separate authentication screen need be displayed to the user, and no separate fingerprint sensor need be used. Rather, by simply touching the icon that represents the functionality the user desires to invoke and for which user authentication is used, the user's fingerprint is authenticated. The sensing component can have different regions operating with different sensing component resolutions, and/or automatically change sensing component resolutions in response to the user touching an icon, thus conserving power by not keeping the entire sensing component always running in a high sensing component resolution.

The techniques discussed herein support various usage scenarios. For example, a user's device can support different functionality (e.g., run multiple applications) that use different authentication accuracies. By simply touching an icon with his or her finger to run the application represented by the icon, the user's fingerprint is automatically authenticated using the appropriate authentication accuracy for the application represented by the icon. By way of another example, the user's device supports high sensing component resolutions to authenticate fingerprints, but can use low sensing component resolutions at other times. Thus, the user's fingerprint can be authenticated by activating a high sensing component resolution, but the device can conserve power by keeping the low sensing component resolution activated after the user's fingerprint has been sensed.

Figure 14:
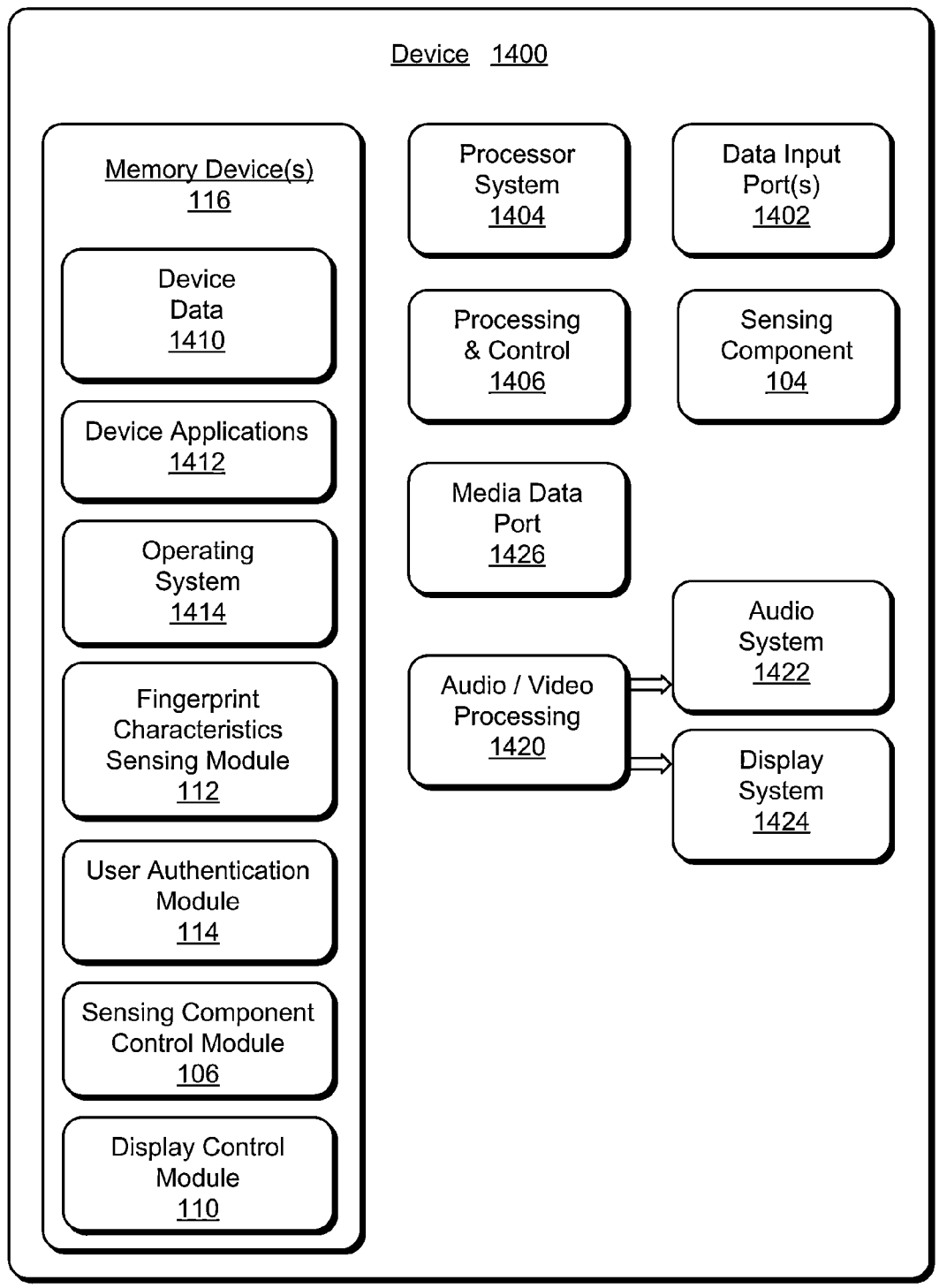
FIG. 14 illustrates various components of an example electronic device that can implement embodiments of the adaptive sensing component resolution based on touch location.

FIG. 14 illustrates various components of an example electronic device 1400 that can be implemented as a device as described with reference to any of the previous FIGS. 1-13. The device may be implemented as any one or combination of a fixed or mobile device, in any form of a consumer, computer, portable, user, wearable, communication, phone, navigation, gaming, messaging, Web browsing, paging, media playback, and/or other type of electronic device, such as the device 102.

The electronic device 1400 can include one or more data input ports 1402 via which any type of data, media content, and/or inputs can be received, such as user-selectable inputs, messages, music, television content, recorded video content, and any other type of audio, video, and/or image data received from any content and/or data source. The data input ports 1402 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 1400 of this example includes a processor system 1404 (e.g., any of microprocessors, controllers, and the like), or a processor and memory system (e.g., implemented in an SoC), which process computer-executable instructions to control operation of the device. A processing system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 1406. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 1400 also includes one or more memory devices 116 that enable data storage, examples of which include random access memory (RAM), non-volatile memory (e.g., read-only memory (ROM), flash memory, EPROM, EEPROM, etc.), and a disk storage device. A memory device 116 provides data storage mechanisms to store the device data 1410, other types of information and/or data, and various device applications 1412 (e.g., software applications). For example, an operating system 1414 can be maintained as software instructions with a memory device and executed by the processor system 1404.

In embodiments, the electronic device 1400 includes a fingerprint characteristics sensing module 112, a user authentication module 114, a sensing component control module 106, and a display control module 110 as described above. Although represented as a software implementation, each of the module 106, module 110, module 112, and module 114 may be implemented as any form of a control application, software application, signal-processing and control module, firmware that is installed on the device, a hardware implementation of the controller, and so on. The electronic device 1400 also includes a sensing component 104 as described above.

The electronic device 1400 can also include an audio and/or video processing system 1420 that processes audio data and/or passes through the audio and video data to an audio system 1422 and/or to a display system 1424. The audio system and/or the display system may include any devices that process, display, and/or otherwise render audio, video, display, and/or image data, including the display component 108 discussed above. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1426. In implementations, the audio system and/or the display system are external components to the electronic device. Alternatively or in addition, the display system can be an integrated component of the example electronic device, such as part of an integrated touch interface.

Although embodiments of adaptive sensing component resolution based on touch location have been described in language specific to features and/or methods, the subject of the appended claims is not necessarily limited to the specific features or methods described. Rather, the specific features and methods are disclosed as example implementations of adaptive sensing component resolution based on touch location

The invention claimed is:

1. A method comprising:
    displaying, by a display of a device, multiple icons;
    activating, by the device, in a low resolution mode, a sensing component of the device for detecting touches at the display;
    while the sensing component operates in the low resolution mode, detecting, by the device, an object touching a location of the display at which a particular icon from the multiple icons is displayed;
    determining, by the device, that the particular icon is associated with a higher resolution mode of the sensing component, the higher resolution mode being of greater resolution than the low resolution mode; and
    responsive to detecting the object touching the location of the display at which the particular icon is displayed, activating, by the device, in the higher resolution mode, at least one area of the sensing component that corresponds to the location of the display at which the particular icon is displayed.

2. The method as recited in claim 1, wherein activating, in the higher resolution mode, the at least one area of the sensing component that corresponds to the location of the display at which the particular icon is displayed comprises activating substantially all of the sensing component in the higher resolution mode.

3. The method as recited in claim 1, wherein activating, in the higher resolution mode, the at least one area of the sensing component that corresponds to the location of the display at which the particular icon is displayed comprises activating, by the device, a portion of the sensing component that is at least within a threshold distance of the location of the display at which the particular icon is displayed.

4. The method as recited in claim 1, wherein activating, in the higher resolution mode, the at least one area of the sensing component that corresponds to the location of the display at which the particular icon is displayed comprises activating, by the device, drive lines and sense lines of a sensing grid of the sensing component that are at least within a threshold distance of the location of the display at which the particular icon is displayed.

5. The method as recited in claim 1, wherein the higher resolution mode is one of multiple higher resolution modes that each have a greater resolution than the low resolution mode and identifying the higher resolution mode comprises identifying, by the device, based on a security setting of the particular icon and from the multiple higher resolution modes, the higher resolution mode that is associated with the particular icon.

6. The method as recited in claim 1, further comprising:
    while the sensing component is in the high resolution mode, sensing, by the device, a fingerprint at the at least one area of the sensing component;
    authenticating, by the device, the fingerprint; and
    responsive to authenticating the fingerprint, returning, by the device, the at least one area of the sensing component to the low resolution mode.

7. The method as recited in claim 1, wherein the object is a first object and the particular icon is a first icon, the method further comprising:
    returning, by the device, the at least one area of the sensing component to the low resolution mode;
    while the sensing component operates in the low resolution mode, detecting, by the device, a second object touching an additional icon from the multiple icons; and
    while the device detects the second object touching the additional icon, keeping, by the device, the sensing component in the low resolution mode.

8. The method of claim 1, further comprising:
    while operating the at least one area in the higher resolution mode, operating, by the device, in the low resolution mode, remaining areas of the sensing component other than the at least one area.

9. The method of claim 1, wherein determining that the particular icon is associated with the higher resolution mode of the sensing component comprises:
- receiving, by the device, information specifying the higher resolution mode from at least one of an application associated with the one icon, a remote service associated with the one icon, a user associated with the device, or an administrator associated with the device; and
- determining, by the device, based on the information, the higher resolution mode.

10. The method of claim 1, wherein the location comprises a first location and the at least one area comprises a first area, the method further comprising:
- displaying, by the display, the particular icon at a second location of the display that is different than the first location;
- while the sensing component, including the at least one area, operates in the low resolution mode, detecting, by the device, the object touching the second location of the display at which the particular icon is displayed; and
- responsive to detecting the object touching the second location of the display at which the particular icon is displayed, activating, by the device, in the higher resolution mode, a second area of the sensing component that corresponds to the second location of the display, wherein the second area is different than the first area.

11. A device comprising:
- a display control module configured to display multiple icons at a display;
- a sensing component operable in multiple resolution modes including a low resolution mode and a higher resolution mode, the higher resolution mode being of greater resolution than the low resolution mode; and
- a sensing component control module configured to:
  - while the sensing component operates in a low resolution mode, detect an object touching a location of the display at which a particular icon from the multiple icons is displayed;
  - determine that the particular icon is associated with the higher resolution mode of the sensing component; and
  - responsive to detecting the object touching the location of the display at which the particular icon is displayed, activate, in the higher resolution mode, at least one area of the sensing component that corresponds to the location of the display at which the particular icon is displayed.

12. The device as recited in claim 11, further comprising a driver component and a multiplexer component configured to activate different portions of the sensing component in the higher resolution mode at different times.

13. The device as recited in claim 11, wherein the sensing component control module is further configured to activate, in the higher resolution mode, the at least one area of the sensing component that corresponds to the location of the display at which the particular icon is displayed by activating substantially all of the sensing component in the higher resolution mode.

14. The device as recited in claim 11, wherein the sensing component control module is further configured to activate, in the higher resolution mode, the at least one area of the sensing component that corresponds to the location of the display at which the particular icon is displayed by activating a portion of the sensing component that is at least within a threshold distance of the location of the display at which the particular icon is displayed.

15. The device as recited in claim 11, wherein the sensing component comprises a sensing grid, and the sensing component control module is further configured to activate, in the higher resolution mode, the at least one area of the sensing component by activating drive lines and sense lines of the sensing grid that are at least within a threshold distance of the location of the display at which the particular icon is displayed.

16. The device as recited in claim 11, wherein the higher resolution mode is one of multiple higher resolution modes from the multiple resolution modes that each have a greater resolution than the low resolution mode and the sensing component control module is further configured to identify the higher resolution mode by identifying, based on a security setting of the one icon and from the multiple resolution modes, the higher resolution mode that is associated with the particular icon.

17. The device as recited in claim 11, wherein the sensing component control module is further configured to:
- while the sensing component is in the high resolution mode, sense a fingerprint at the at least one area;
- authenticate the fingerprint; and
- responsive to authenticating the fingerprint, return the sensing component to the low resolution mode.

18. The device as recited in claim 11, wherein the sensing component control module is further configured to: while operating the at least one area in the higher resolution mode, operate, in the low resolution mode, remaining areas of the sensing component other than the at least one area.

19. The device as recited in claim 11, wherein the sensing component control module is further configured to determine that the particular icon is associated with the higher resolution mode of the sensing component by at least:
- receiving information specifying the higher resolution mode from at least one of an application associated with the particular icon, a remote service associated with the particular icon, a user associated with the device, or an administrator associated with the device; and
- determining, based on the information, the higher resolution mode.

20. The device as recited in claim 11, wherein the location comprises a first location, the at least one area comprises a first area, and the sensing component control module is further configured to:
- while the sensing component, including the at least one area, operates in the low resolution mode, detect, the object touching a second location of the display at which the one particular is displayed, wherein the second location of the display is different than the first location; and
- responsive to detecting the object touching the second location of the display at which the particular icon is displayed, activate, in the higher resolution mode, a second area of the sensing component that corresponds to the second location of the display, wherein the second area is different than the first area.

* * * * *